United States Patent
Muller

(10) Patent No.: US 11,584,644 B2
(45) Date of Patent: Feb. 21, 2023

(54) REGENERATION OF ACID CONTAINING PEROXY ACIDS OF SULFUR

(71) Applicant: Veolia North America Regeneration Services, LLC, Houston, TX (US)

(72) Inventor: Thomas L. Muller, Newark, DE (US)

(73) Assignee: Veolia North America Regeneration Services, LLC, Houston, TX (US)

( * ) Notice: Subject to any disclaimer, the term of this patent is extended or adjusted under 35 U.S.C. 154(b) by 0 days.

(21) Appl. No.: 17/672,146

(22) Filed: Feb. 15, 2022

(65) Prior Publication Data

US 2022/0169507 A1 Jun. 2, 2022

Related U.S. Application Data

(63) Continuation-in-part of application No. 17/121,266, filed on Dec. 14, 2020, now Pat. No. 11,345,594.

(60) Provisional application No. 62/947,863, filed on Dec. 13, 2019.

(51) Int. Cl.
 *C01B 17/775* (2006.01)
 *C01B 17/765* (2006.01)

(52) U.S. Cl.
 CPC ........ *C01B 17/775* (2013.01); *C01B 17/7655* (2013.01)

(58) Field of Classification Search
 CPC ............................ C01B 17/775; C01B 17/7655
 See application file for complete search history.

(56) References Cited

U.S. PATENT DOCUMENTS

| 3,752,884 A | 8/1973 | Sasse |
| 3,760,061 A | 9/1973 | Hammond |
| 3,780,499 A | 12/1973 | Dorr et al. |
| 2005/0036936 A1 | 2/2005 | Christensen et al. |

FOREIGN PATENT DOCUMENTS

| DE | 670966 | 1/1939 |
| DE | 1234912 | 2/1967 |
| GB | 930584 | 7/1963 |

OTHER PUBLICATIONS

T L Muller, Sulfuric Acid and Sulfur Trioxide in Kirk Othmer Encyclopedia of Chemical Technology, John Wiley & Sons, Inc., New York, published online May 19, 2006; 52 pages.
D K Louie, Sulphuric Acid Regeneration in Handbook of Sulphuric Acid Manufacture, D K L Engineering, (2005) pp. 7-1 to 7-10.
W W Dueker and J R West, The Manufacture of Sulfuric Acid, Reinhold Publishing Corp., New York, (1959) pp. 320-324.
A M Fairlie, Sulfuric Acid Manufacture, Reinhold Publishing Corp., New York (1936) pp. 544-549.

*Primary Examiner* — Timothy C Vanoy
(74) *Attorney, Agent, or Firm* — Dunlap Codding, P.C.

(57) ABSTRACT

A method for treating a spent oxidizing acid which contains at least one of $H_2O_2$ and one or more peroxy acids of sulfur comprising contacting the spent oxidizing acid with a quantity of $SO_2$ in excess of an equilibrium quantity required to convert the $H_2O_2$ and peroxy acids of sulfur to sulfuric acid.

6 Claims, 3 Drawing Sheets

REGENERATION OF ACID CONTAINING PEROXY ACIDS OF SULFUR

CROSS REFERENCE TO RELATED APPLICATIONS

This application is a continuation in part of U.S. application Ser. No. 17/121,266 filed Dec. 14, 2020, which claims benefit under 35 USC § 119(e) of provisional U.S. Application Ser. No. 62/947,863 filed Dec. 13, 2019.

FIELD OF THE INVENTION

The inventive concepts disclosed and claimed herein relate generally to processes for regeneration of sulfuric acid, and, more particularly, to processes for regeneration of such acids which contain hydrogen peroxide and/or peroxy acids of sulfur.

BACKGROUND OF THE INVENTION

Sulfuric acid ($H_2SO_4$) is used in a number of commercial chemical operations. For example, it is used in alkylation of hydrocarbons, in the preparation of methyl methacrylate, and in the cleaning of microelectronics, such as silicon wafers. In these processes the sulfuric acid becomes diluted and/or contaminated ("spent") so that it is no longer suitable for use and must then be either neutralized for disposal or regenerated. Neutralization typically includes reaction with a base, such as lime, limestone, or caustic, followed by disposal of the resulting sulfate salt. Regeneration typically includes impurity removal and concentration of the sulfuric acid or decomposition of the acid to sulfur dioxide ($SO_2$) which is subsequently used to make virgin acid.

In some applications, hydrogen peroxide ($H_2O_2$) may have been used to scrub $SO_2$ from gas streams. The hydrogen peroxide content of the resulting sulfuric acid scrubbing solution (typically in the range of from 30-85 wt % $H_2SO_4$) can range up to 5 percent or higher, forming $H_2SO_5$ (sometimes referred to as Caro's acid). In other applications, concentrated sulfuric acid is mixed with hydrogen peroxide to provide a very powerful etching or cleaning agent. For example, Piranha solutions are made by mixing concentrated sulfuric acid with hydrogen peroxide, and these solutions are used for cleaning trace amounts of organic residues, such as hardened photo resist, from silicon wafers.

The presence of even small quantities of Caro's acid in a spent acid makes chemical operators hesitant to use these spent acids for fear the $H_2SO_5$ may trigger unwanted and possibly uncontrollable side reactions. Thus, few alternatives to neutralization or standard acid regeneration presently exist for treating spent Piranha solutions and other spent acids that contain hydrogen peroxide, $H_2SO_5$ and/or other peroxy acids of sulfur. Neutralization is expensive and merely leaves a less toxic waste material. Standard acid regeneration involves decomposition of the spent acid, which requires significant energy input, and it also produces minimal, but not negligible, liquid waste and undesirable air emissions.

SUMMARY OF THE INVENTION

The presently disclosed inventive concepts relate to an improvement in conventional methods for treating a spent oxidizing acid. In one embodiment, a spent acid containing hydrogen peroxide and/or peroxy acids of sulfur is contacted with a quantity of $SO_2$ in excess of an equilibrium quantity required to convert the peroxy acids to sulfuric acid. Excess $SO_2$ can be catalytically converted to $SO_3$, and the $SO_3$ can then be absorbed into a sulfuric acid stream to thereby produce product sulfuric acid.

In another embodiment, a spent sulfuric acid solution containing at least one of $H_2SO_5$ and/or $H_2O_2$ is injected into a drying tower in a spent acid regeneration plant, thereby by-passing the decomposition step which is the standard injection point. A sulfuric acid stream is circulated into the drying tower, the circulating sulfuric acid stream having an $SO_2$ concentration of 5% or greater. $SO_2$ gas dissolved in the circulating sulfuric acid stream is in excess of a stoichiometric quantity required to convert the $H_2SO_5$ and/or $H_2O_2$ to sulfuric acid.

In an alternate embodiment, a spent oxidizing acid solution, e.g., a spent sulfuric acid solution, which contains at least one of $H_2SO_5$ and/or $H_2O_2$, is injected into a drying tower in a spent acid regeneration plant, thereby by-passing the decomposition step, which would otherwise be the standard spent acid injection point. A sulfuric acid stream is circulated into the drying tower counter-currently to a process gas stream, which enters the tower having an $SO_2$ concentration of about 5% by volume or greater. $SO_2$, which becomes dissolved in the circulating sulfuric acid stream, reaches a value in excess of a stoichiometric quantity required to convert the $H_2O_2$, $H_2SO_5$, and/or and any other peroxy acids of sulfuric acid that may be present in the spent oxidizing acid solution, to sulfuric acid.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
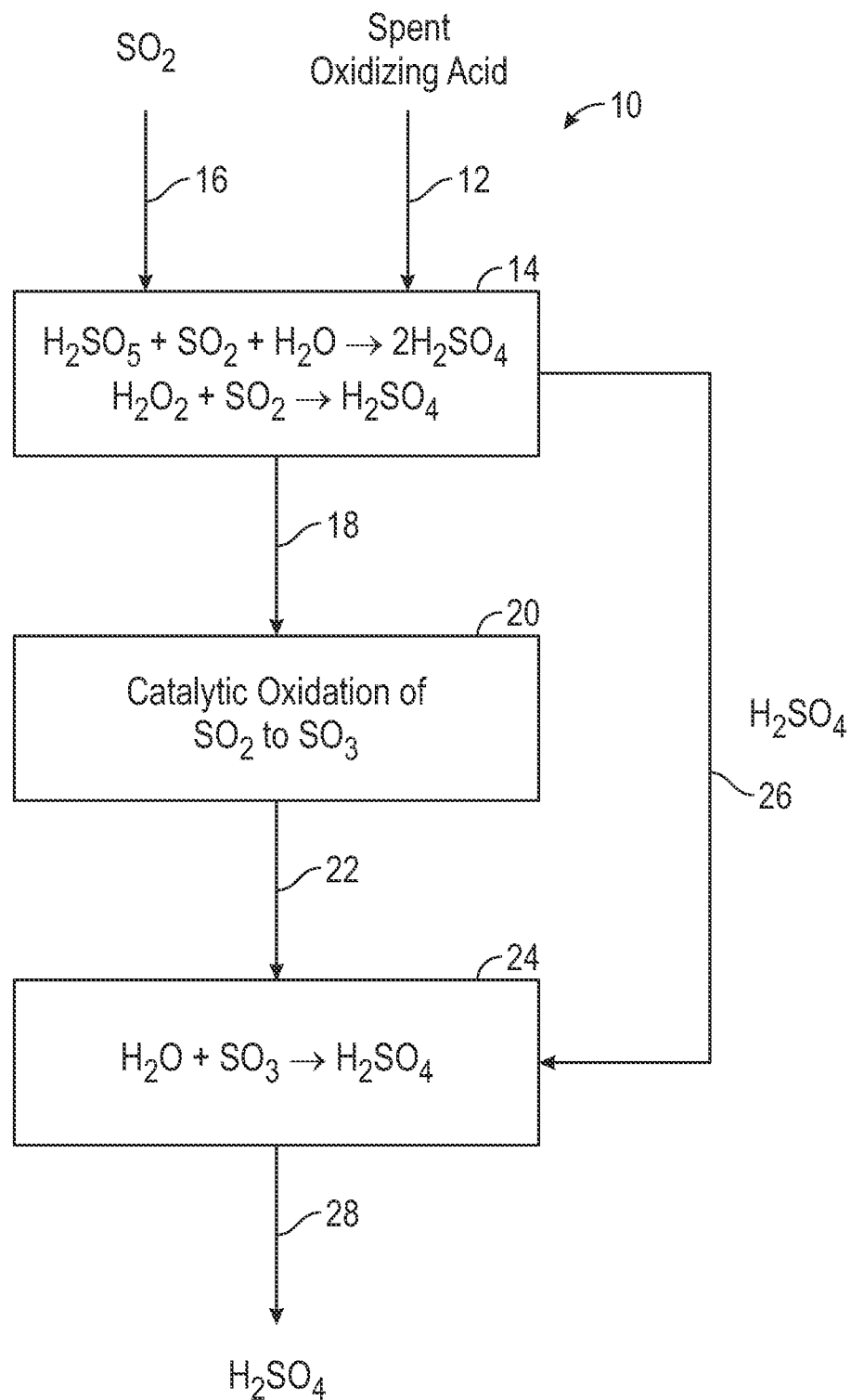
FIG. 1 is a flowsheet showing treatment of spent Piranha solution in accordance with the presently disclosed inventive concepts wherein the spent Piranha solution is injected into a drying tower of a spent acid regeneration plant.

Before explaining at least one embodiment of the presently disclosed inventive concept(s) in detail, it is to be understood that the presently disclosed inventive concept(s) is not limited in its application to the details of construction and the arrangement of the components or steps or methodologies set forth in the following description or illustrated in the drawings. The presently disclosed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed inventive concept(s) shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the presently disclosed inventive concept(s) have been described in terms of preferred embodiments, it will be apparent to those of skill in the art that variations may be applied to the articles and/or methods and in the steps or in the sequence of steps of the method described herein without departing from the concept, spirit, and scope of the presently disclosed inventive concept(s). All such similar substitutes and modifications apparent to those skilled in the art are deemed to be within the spirit, scope, and concept of the presently disclosed inventive concept(s).

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrase "essentially free" means that the subsequently described composition is completely free of the referenced matter or that the subsequently described composition is free of the referenced matter to an extent that one skilled in the art would consider it to be functionally completely free of the referenced matter or that the subsequently described composition contains less than 0.1 wt % of the referenced matter.

The term "associate" as used herein will be understood to refer to the direct or indirect connection of two or more items.

The term "oxidizing acid" refers to any sulfuric acid solution containing hydrogen peroxide, $H_2SO_5$ or other peroxy acid(s) of sulfur.

The term "Caro's acid" as used herein refers to $H_2SO_5$.

The term "Piranha solution" refers to any sulfuric acid solution, usually concentrated, containing $H_2O_2$, $H_2SO_5$, and other peroxy acid(s) of sulfur that is used for cleaning components in the electronics industry.

The phrase "spent acid(s) containing Caro's acid" and "spent oxidizing acid(s)" are meant to include spent Piranha solution as well as spent gas-scrubbing and other solutions containing hydrogen peroxide, Caro's acid, and/or other peroxy acid(s) of sulfur.

Regarding applications using Piranha solution for cleaning silicon wafers and the like, the spent Piranha solution is diluted with water, but is otherwise relatively free of impurities. Thus, one might consider the acid to be relatively easily recycled for other uses. However, as discussed above, the presence of $H_2SO_5$ makes chemical operators hesitant to use spent Piranha solution for fear the remaining oxidant may trigger unwanted and possibly uncontrollable side reactions. Although Piranha solution has been used for electronic chip manufacture for many years, during that time the spent piranha acid has been disposed of most commonly via neutralization, the traditional sulfuric acid regeneration (SAR) process or, more rarely, in simple applications, such as waste water pH control. Few alternatives to neutralization or standard regeneration currently exist for these waste acids.

It has been discovered that a spent oxidizing acid containing sulfuric acid and $H_2SO_5$ and/or $H_2O_2$ can be treated with $SO_2$ to eliminate the $H_2SO_5$ and $H_2O_2$ for example, by reacting to form $H_2SO_4$ according to the reactions $H_2SO_5 + SO_2 + H_2O \rightarrow 2H_2SO_4$ and $H_2O_2 + SO_2 \rightarrow H_2SO_4$. Referring now to FIG. 1, a method and process 10 is shown for treating a spent oxidizing acid 12 containing sulfuric acid and at least one of $H_2SO_5$ and $H_2O_2$. The process 10 includes contacting the spent oxidizing acid 12 in a contacting tower, e.g., a drying tower, 14 with a quantity of reactant $SO_2$ gas 16 in excess of the stoichiometric quantity required to convert the $H_2SO_5$ and/or $H_2O_2$ to sulfuric acid. Thereafter, unreacted or excess $SO_2$ that leaves contacting tower 14 as an $SO_2$ gas stream 18 can be introduced to a catalytic oxidation step 20 as shown wherein the $SO_2$ is catalytically oxidized to $SO_3$. The resulting $SO_3$ stream 22 can then be fed to an absorption tower 24 wherein the $SO_3$ is absorbed into sulfuric acid which includes recycle acid and $H_2SO_4$ stream 26 to produce a sulfuric acid product 28 that is essentially free of $H_2SO_5$ and $H_2O_2$.

The spent oxidizing acid 12 can be any acid containing sulfuric acid and $H_2O_2$, $H_2SO_5$, or other peroxy acid(s) of sulfur. For example, Piranha solution is typically a mixture of sulfuric acid and hydrogen peroxide that is used to clean organic residues from substrates, such as silicon chips and glassware. A typical mixture is three parts of concentrated sulfuric acid and one part of 30% hydrogen peroxide solution. Mixing the solution is quite exothermic. It should be used fresh as it generates gas and cannot be stored in a closed container. Since a Piranha acid solution reacts violently with any residues on the substrates, the substrates are usually pre-cleaned prior to contact with the Piranha solution. After cleaning, the substrates are washed with purified water to remove adhering Piranha solution. Spent Piranha solution contains purified water used to wash the Piranha-cleaned substrate, but very low concentrations of other impurities. Because it reacts so violently with many materials commonly disposed of as chemical waste, it must be neutralized with care or recycled to a sulfuric acid regeneration operation.

Caro's acid, peroxymonosulfuric acid, is an equilibrium product of hydrogen peroxide and sulfuric acid and the major reactive component of the Piranha solution described above. Caro's acid has many uses other than as a Piranha solution. For example, it has been used in the mining and hydrometallurgical fields for destroying cyanide residuals. Spent solutions containing Caro's acid can have some of the same problematic issues as spent Piranha solution. Spent sulfuric acid solutions containing Caro's acid and having sulfuric acid concentrations of 30 wt % or more are suitable feeds for the presently disclosed and claimed inventive methods and processes.

Other feed sources that can be successfully treated according to the described and claimed inventive concept(s) can be spent scrubbing solutions wherein hydrogen peroxide or other peroxy acids of sulfur that have been used to scrub sulfur dioxide from waste gases. The reaction between sulfur dioxide and hydrogen peroxide or Caro's acid, has long been known and has been the basis of scrubbing technologies to remove sulfur dioxide from sulfuric acid plant stack gas for many decades. Peroxide scrubbing to remove sulfur dioxide is currently being used at several U.S. locations. The goal of these processes, however, has always been to destroy the sulfur dioxide, not the peroxide, Caro's acid, or other peroxy acids of sulfur. In these instances, the liquid phase contains low levels of peroxide and typically 40-50 wt % sulfuric acid. This acid concentration is chosen for two reasons: (1) the solubility of sulfur dioxide in 40-50% acid and lower sulfuric acid concentrations is greater than in concentrated acid; and (2) the reaction rate of sulfur dioxide with peroxide or Caro's acid is faster in this strength range than it is in concentrated acid.

For example, U.S. Pat. No. 3,760,061 ("High-Strength Acid Containing $H_2O_2$ to Scrub $SO_2$") discloses the need to modify the scrubber design to make the sulfuric acid containing hydrogen peroxide or other peroxy acids of sulfur the continuous liquid phase where the concentration of the gas phase to be treated contains 500-5000 ppm or higher sulfur dioxide. It is stated therein, "At sulfuric acid concentrations above about 80 percent in the aqueous scrubbing medium, the low reaction rate of $SO_2$ with hydrogen peroxide or peroxy acids of sulfur makes the use of conventional gas-liquid contacting equipment, wherein the gas phase is continuous, impractical for significant removal of $SO_2$ from gaseous streams." The reason given is that "in the more concentrated solutions, the aqueous scrubbing medium more quickly becomes saturated with $SO_2$ because of the slower reaction rate of dissolved $SO_2$ with hydrogen peroxide and peroxy acids of sulfur present in the aqueous scrubbing medium." However, the present inventive methods and processes use the converse reaction, removal of hydrogen peroxide, Caro's acid, and other peroxy acids of sulfur from even very concentrated sulfuric acid using conventional gas-liquid contacting equipment wherein the gas phase is continuous.

Regarding the reactant $SO_2$, example sources of the $SO_2$ gas 16 include smelters, roasting of sulfide ores and concentrates, sulfur oxidation, $H_2S$ oxidation, and decomposition of sulfuric acid. Generally, $SO_2$ concentrations of 5-14 vol % are sufficient to convert Caro's acid and hydrogen peroxide using conventional contacting equipment and at sulfuric acid concentrations above 80 wt %. However, $SO_2$ concentrations greater than 14 vol % are also suitable, and $SO_2$ concentrations greater than 50 vol % can be present in the gas of some flash smelting processes with oxygen enrichment.

In one embodiment described in a later section of this disclosure, the reactant $SO_2$ gas 16 is provided by a spent acid decomposition furnace in a pre-existing, i.e., conventional, spent acid regeneration (SAR) plant.

The contacting tower 14 provides gas/liquid contact such that $SO_2$ gas contacts the spent oxidizing acid 12 to convert $H_2SO_5$ to $H_2SO_4$. ($H_2SO_5+SO_2+H_2O \rightarrow 2H_2SO_4$.) Typically, the reactant $SO_2$ gas 16 has a concentration of about 5 vol % $SO_2$ or higher, or about 5 vol % to about 14 vol % $SO_2$, or about 8 vol % to about 14 vol % $SO_2$. In some cases, the reactant $SO_2$ gas 16 can have a concentration of about 14 vol % to about 50 vol % or more $SO_2$. For example, the reactant $SO_2$ gas 16 can have a concentration of about 30 vol % to about 60 vol %. Concentrated recycle $H_2SO_4$ typically has a strength of about 90 wt % or higher.

Suitable contacting tower designs are well known to those skilled in the art. The contactor design can be a differential gas-liquid contactor wherein mass transfer happens within the entire length of the contactor. Suitable examples of differential contactors include, but are not limited to: falling-film columns, packed columns, bubble columns, spray towers, and the like. Stagewise gas-liquid contactors can also be used, examples including, but not limited to, plate columns, rotating disc contactors, and the like.

The excess $SO_2$ stream 16 is of sufficient volume and strength (concentration) to ensure complete conversion of the $H_2O_2$ and/or $H_2SO_5$. Typically, the excess $SO_2$ stream 16 has a concentration in excess of about 8 vol % $SO_2$. In some embodiments, the excess $SO_2$ stream 16 has a concentration of about 8 vol % to about 14 vol % $SO_2$, or about 9 vol % to about 12 vol % $SO_2$.

Catalytic oxidation of $SO_2$ to $SO_3$ is well known to those skilled in the art. A catalyst, typically a vanadium-based catalyst, catalyzes $SO_2$ oxidation at temperatures in a range of 400° C. to 600° C. The oxidation can be carried out in, for example, a sequence of three to five catalyst beds with gas cooling between beds.

The $SO_3$ stream 22 exiting the catalytic oxidation step 20 is fed to an absorption step or absorption tower 24 wherein the $SO_3$ is taken up by the water in the acid stream 26 and any additional needed water according to the reaction: $SO_3 + H_2O \rightarrow H_2SO_4$. Acid stream 26 and any necessary additional water can be added to a circulating stream in the absorption step or absorption tower 24. In some embodiments, the $SO_3$ is of sufficient quantity to increase the concentration of acid stream 26 to 90 wt % $H_2SO_4$ or higher. Types and designs of suitable absorption towers are well known by those skilled in the art. For example, a packed tower design can be used for absorption tower 24. The product sulfuric acid 28 can be made to have a concentration anywhere between that of the oxidizing acid 12 up to over 99 wt % $H_2SO_4$. In one embodiment, sufficient $SO_2$ is added to make product sulfuric acid 28 in a range of about 94% to over 99 wt % $H_2SO_4$.

In one embodiment, a portion of the acid stream 26 is air stripped to remove $SO_2$, and the stripped acid is used as product sulfuric acid.

Figure 2:
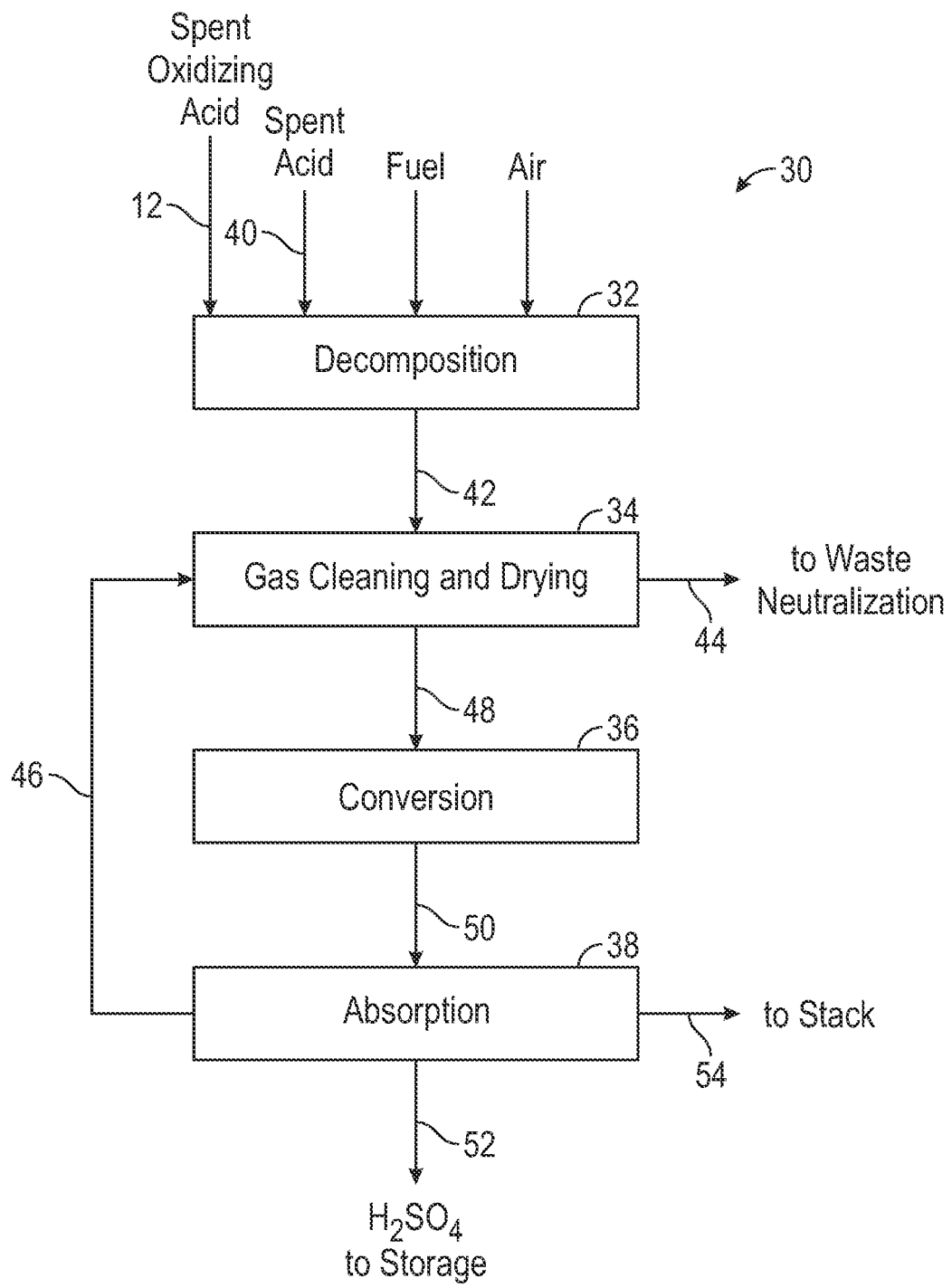
FIG. 2 is a flowsheet showing a prior art spent acid regeneration operation which illustrates a decomposition step prior to gas cleaning and drying.

The environmental and economic advantages of the presently disclosed and claimed inventive methods and processes should be obvious. Spent oxidizing acids are traditionally treated in conventional spent acid regeneration (SAR) plants. A traditional (prior art) spent acid regeneration plant 30 is outlined in FIG. 2 and includes four major processing operations: thermal decomposition 32, gas cleaning and drying 34, conversion 36, and absorption 38. In the thermal decomposition operation 32, the spent acid 40 and spent oxidizing acid 12 are thermally decomposed in a furnace operating in excess of 1000° C. and requiring significant fuel (such as natural gas) or other form of energy to produce sulfur dioxide. The thermal decomposition of spent acid 40 and spent oxidizing acid 12 produces a sulfur dioxide ($SO_2$) process gas 42; however, equilibrium considerations limit the amount of sulfur dioxide that can be produced to about 98.5% of the total sulfur present in the waste acid 40 and spent oxidizing acid 12. The remaining sulfur exits the decomposition furnace as sulfur trioxide.

The sulfur dioxide ($SO_2$) process gas 42 leaving the thermal decomposition section 32 is treated in the gas cleaning and drying section 34 to remove dust and ashes and to reduce the water vapor content to allow production of the desired acid strength. The sulfur trioxide leaving the thermal decomposition section 32 is converted to sulfuric acid during gas cleaning and leaves the process as a weak (~5%) acid stream 44 which must be neutralized with caustic or other suitable base. This represents a yield loss and results in a waste effluent stream that must be disposed of. While most of the total sulfur is recovered, the waste stream 44 represents about 0.5% to 3% of the sulfur dioxide. The cleaned $SO_2$ gas is dried by contacting with a concentrated acid stream containing 93 to over 99 wt % $H_2SO_4$. Acid stream 46 operates to balance water which enters the process via stream 42. Drying is accomplished in a packed bed acid tower or drying tower to produce a dried clean sulfur dioxide process gas 48.

Dried clean sulfur dioxide process gas 48 is oxidized to sulfur trioxide ($SO_3$) stream 50 in the conversion section 36 utilizing a vanadium catalyst in a staged converter vessel. In the absorption section 38, sulfur trioxide stream 50 from the converter vessel is subsequently absorbed in concentrated sulfuric acid and reacted with water to produce additional "virgin" sulfuric acid product 52. Due to equilibrium considerations, it is impossible to convert all of the sulfur dioxide to sulfur trioxide. Unconverted sulfur dioxide leaves the conventional SAR plant as an air emission 54. Existing SAR plants, using the modern dual absorption process and the best available catalysts, can achieve overall conversion of sulfur dioxide to sulfur trioxide in the range of 99.7% or better. This amounts to a sulfur dioxide emission rate of up to 4 lbs. sulfur dioxide per ton of 100% acid produced.

It has been discovered according to the described and claimed inventive concept(s) that spent oxidizing acid can be introduced directly to the drying step (Shown as 14 in FIGS. 1 and 34 in FIG. 2) in a spent acid regeneration plant, thereby by-passing the decomposition step 32 of the spent acid regeneration plant, saving significant energy and reducing emissions. For example, spent oxidizing acid, such as spent Piranha solution from electronic chip manufacture or any sulfuric acid stream which contains at least one of hydrogen peroxide, Caro's acid, other peroxy acids of sulfur and/or mixture(s) thereof, can be fed directly into a drying tower (Shown as 14 in FIG. 1) in a spent acid regeneration plant, thereby by-passing the decomposition step which would otherwise be the standard spent acid injection point. A sulfuric acid stream is circulated into the drying tower counter-currently with a processing gas which enters the tower having an $SO_2$ concentration of about 5% by volume or greater. The high concentration of sulfur dioxide that becomes dissolved in the circulating acid in the drying tower, meaning a concentration in excess of a stoichiometric quantity required to convert the $H_2SO_5$ and/or $H_2O_2$ in the spent oxidizing acid solution to sulfuric acid, reacts with any hydrogen peroxide, Caro's acid and/or other peroxy acids of sulfur that may be present in the spent oxidizing acid to thereby produce sulfuric acid. The peroxide-free acid can then be blended with stronger acid in the drying tower and/or $SO_3$ absorption towers to make additional peroxide-free high-quality sulfuric acid. Unlike currently available methods for regenerating spent oxidizing acids, the inventive concept(s) described and claimed herein consumes no significant energy and avoids production of any significant waste streams.

As explained previously, when spent oxidizing acid is fed to the thermal decomposition step as conventionally practiced, the spent oxidizing acid is thermally decomposed to sulfur dioxide. This requires high heat (>1000° C.) and thus requires considerable fuel in the form of natural gas or other fuel. In the proposed inventive methods and processes, the acid is not decomposed and thus, no fuel is required.

Further, since thermal decomposition equilibrium limits the amount of sulfur dioxide that can be produced to about 98.5% of the total sulfur present in the acid, the remaining 1.5% of the sulfur exits the decomposition furnace as sulfur trioxide which leaves the SAR process as a weak (~5%) acid stream which must then be neutralized with caustic or another suitable base before it can be released into the environment. This represents a yield loss and results in an undesirable waste effluent stream that must be disposed of. However, in the presently disclosed inventive methods and processes, the spent Piranha solution or another oxidizing acid bypasses the decomposition step, thereby producing no sulfur trioxide that requires subsequent neutralization.

Further yet, in the SAR process the recovered sulfur dioxide produced in the decomposition furnace must be catalytically oxidized to sulfur trioxide. Unconverted sulfur dioxide leaves the SAR plant as an air emission. In the presently disclosed inventive methods and processes, the oxidizing acid, or Piranha solution, is not decomposed to sulfur dioxide; therefore, the catalytic oxidation step is completely bypassed as well. Hence, undesirable sulfur dioxide emissions are also avoided.

Examples are provided herein below. However, the present invention is to be understood to not be limited in its application to the specific process, chemicals, equipment and results. Rather, the Example is simply provided as one of various embodiments and is meant to be exemplary, not exhaustive

EXAMPLE 1

Figure 3:
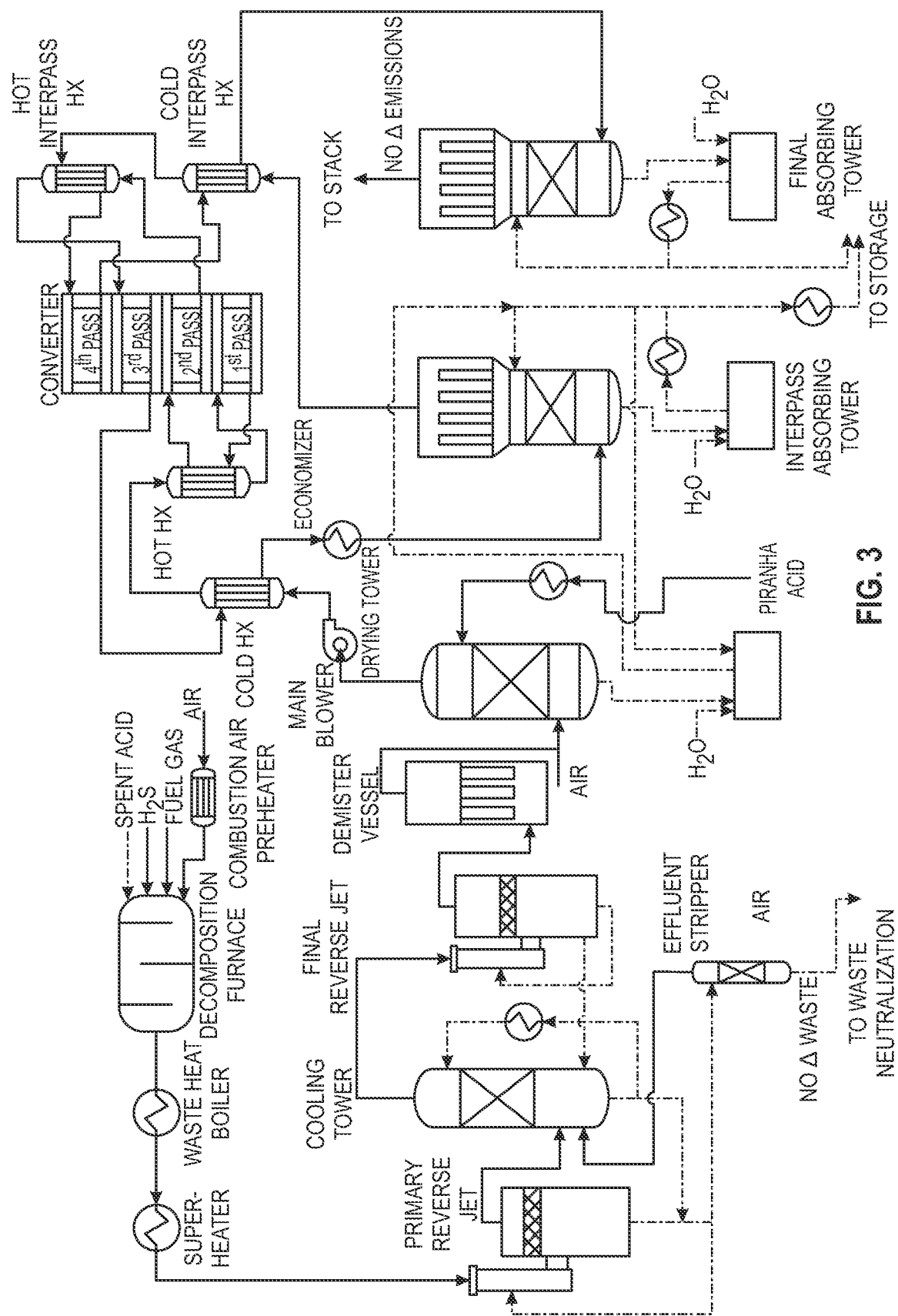
FIG. 3 is a flowsheet showing introduction of a spent oxidizing acid, such as a spent Piranha solution, into a drying tower of a conventional spent acid regeneration operation in accordance with the presently disclosed inventive concepts.

A prophetic example feeds a spent Piranha solution containing 2 wt % hydrogen peroxide and 80 wt % sulfuric acid directly to an upper portion of the drying tower of an SAR plant shown in detail in FIG. 3. The sulfur dioxide concentration in the drying tower is between 4 and 14 vol %.

The spent Piranha acid contains impurities at the ppb level; thus, no impurities need be removed in the gas cleaning section of the SAR plant. Hydrogen peroxide and Caro's acid present in the spent Piranha solution are chemically destroyed to form sulfuric acid according to the following reactions:

$$H_2O_2 + SO_2 \rightarrow H_2SO_4$$

$$H_2SO_5 + SO_2 + H_2O \rightarrow 2H_2SO_4$$

Treatment of the spent Piranha solution produces no waste, as the sulfuric acid produced by the above reactions becomes part of the plant's product.

EXAMPLE 2

In this example, 5 gpm of a spent piranha acid at 80% total acidity is added to an existing spent acid recovery (SAR) plant. Conventionally, this acid would be included as spent acid feed to the decomposition furnace. Changes to conventional production when the spent piranha acid is fed to the drying tower are shown in Table 1 below. 5 gpm of the piranha acid were added to the drying tower as shown in FIG. 3. All numbers are per day.

TABLE 1

Addition of 5 gpm 80% Piranha Acid to the SAR Drying Tower

|  | Conventional Feed to Furnace | Feed to Drying Tower |
|---|---|---|
| Increased Production, tons acid (100%) | 40.8 | 41.4 |
| Natural Gas Consumption, scf | 197.8 | 0 |
| Process Water for acid dilution, gal | — | −2376* |
| Waste Acid to Neutralization, lbs. | 1240 | 0 |
| Liquid Effluent, gal | 2971 | 0 |
| SO$_2$ Air Emissions, lbs. | 32-160** | 0 |

*This is saved water. Water in the piranha acid replaces 2376 gal. of water that would otherwise have been needed for processing other spent acids in the SAR plant.
**The reduction in SO$_2$ emissions depends on the plant age and configuration. The initial value is for the new present plant. However, the higher value is given to describe older plants.

Feeding spent acid to the decomposition furnace requires natural gas (or other fuel) to provide the heat required to chemically decompose the acid. Conversion of the acid to SO$_2$ is only about 98.5%. Unconverted acid is scrubbed from the gas stream and neutralized to produce an aqueous sulfate waste that is discharged as a liquid effluent. Conversion of the resulting SO$_2$ to SO$_3$ is very high, but also not 100%. In a present SAR plant, SO$_2$ emissions are about 0.8 lb. SO$_2$/ton of acid. In older existing SAR plants, the emissions can be as high as 4 lb. SO$_2$/ton of acid. Finally, converting SO$_3$ to H$_2$SO$_4$ product acid requires process water. An excess of water in the piranha acid reduces the total water requirement of the SAR plant.

EXAMPLE 3

In this example, 5 gpm of a spent piranha acid at 90% total acidity is added to an existing spent acid recovery plant. As explained in Example 2, conventionally, this acid would be included in the spent acid feed to the decomposition furnace. Changes to conventional production are shown in Table 2 below when 5 gpm of the spent piranha acid were added to the drying tower as shown in FIG. 3 according to the described inventive concept(s). All numbers are per day.

TABLE 2

Addition of 5 gpm 90% Piranha Acid

|  | Conventional Feed to Furnace | Feed to Drying Tower |
|---|---|---|
| Increased Production, tons acid (100%) | 48.3 | 49 |
| Natural Gas Consumption, scf | 200.2 | 0 |
| Process Water for acid dilution, gal | — | −1555* |
| Waste Acid to Neutralization, lbs | 1470 | 0 |
| Liquid Effluent, gal | 3523 | 0 |
| SO2 Air Emissions, lbs | 39-193** | 0 |

*This is saved water. Water in the piranha acid replaces water that would otherwise have been needed for processing other spent acids in the SAR plant, resulting in a reduction in process water consumption.
**The reduction in SO$_2$ emissions depends on the plant age and configuration. The initial value is for the newer present plant. However, the higher value is given to describe older plants.

Although the presently disclosed and claimed inventive concept(s) has been described in conjunction with the specific language set forth herein above, it is evident that many alternatives, modifications, and variations will be apparent to those skilled in the art. Accordingly, the described and claimed inventive concept(s) is intended to embrace all such alternatives, modifications, and variations that fall within the spirit and broad scope of the specific language set forth herein. Changes may be made in the construction and/or the operation of the various components, elements, and assemblies described herein, as well as in the steps or the sequence of steps of the methods described herein, without departing from the spirit and scope of the presently disclosed inventive concept(s).

What is claimed is:

1. A method for treating a spent oxidizing acid solution which comprises the steps of:
    (a) injecting a spent sulfuric acid solution which contains at least one of H$_2$O$_2$, H$_2$SO$_5$, and/or other peroxy acid(s) of sulfur into a drying tower in a spent acid regeneration plant;
    (b) circulating a sulfuric acid stream into the drying tower counter-currently with a process gas which enters the tower having an SO$_2$ concentration of about 5% by volume or greater;
    (c) wherein SO$_2$, which becomes dissolved in the circulating sulfuric acid stream, reaches a value in excess of a stoichiometric quantity required to convert the at least one of H$_2$O$_2$, H$_2$SO$_5$, and/or and any other peroxy acids of sulfuric acid that may be present in the spent oxidizing acid solution to sulfuric acid.

2. The method of claim 1, wherein the spent oxidizing acid comprises spent Piranha solution.

3. The method of claim 1, wherein the SO$_2$ reacts with greater than 98% of the at least one of H$_2$O$_2$, H$_2$SO$_5$, and any other peroxy acids of sulfuric acid that may be present in the spent oxidizing acid solution.

4. The method of claim 1, wherein a product sulfuric acid stream is taken from the drying tower circulating sulfuric acid stream and comprises 90 wt % or more $H_2SO_4$.

5. The method of claim 4, wherein the product sulfuric acid comprises 96 wt % or more $H_2SO_4$.

6. The method of claim 1, further comprising the steps of:
   catalytically converting excess $SO_2$ leaving the drying tower to $SO_3$; and
   absorbing the catalytically converted $SO_3$ into a sulfuric acid stream.

* * * * *